April 15, 1952     T. M. PORTER     2,593,342
COUPLING FOR JACK ATTACHMENTS AND EXTENSIONS
Filed Dec. 22, 1949
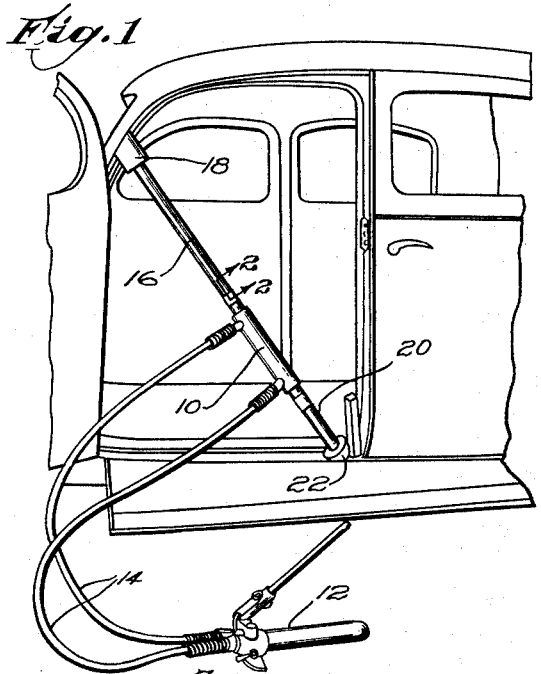
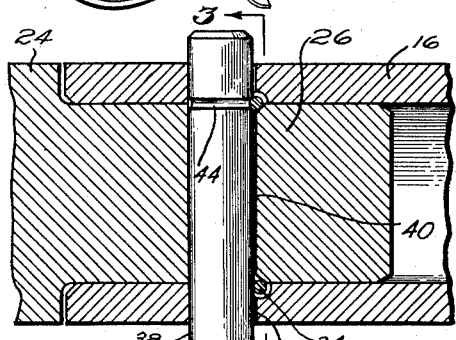
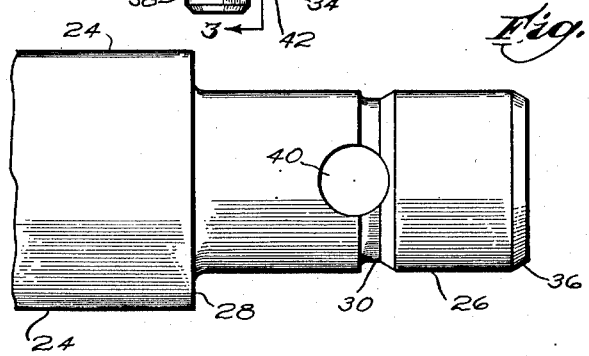
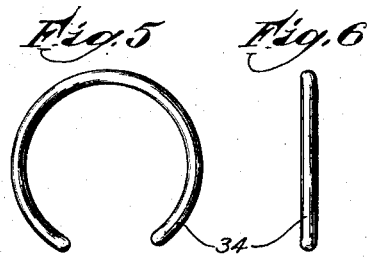
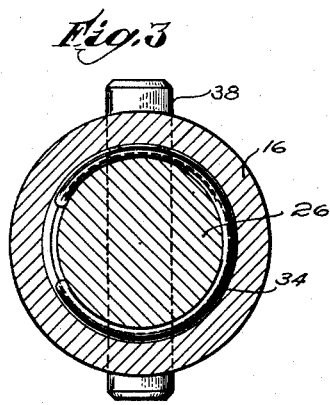
Inventor
Thomas M. Porter Patented Apr. 15, 1952

2,593,342

UNITED STATES PATENT OFFICE 2,593,342

COUPLING FOR JACK ATTACHMENTS AND EXTENSIONS

Thomas M. Porter, Brookline, Mass., assignor to H. K. Porter, Inc., Somerville, Mass., a corporation of Massachusetts Application December 22, 1949, Serial No. 134,466

4 Claims. (Cl. 287—119)

In the repair of damaged automobile bodies great use is made of jacks, usually hydraulic jacks, for bending back deformed parts into their original positions. To fit the exigencies of use tools and attachments of various forms are coupled to the jack, either directly to the ram or cylinder or through extensions, which increase the over-all length of the appliance. Such extensions are usually strong steel tubes. The invention contemplates a strong, inexpensive and conveniently handled coupling for joining such parts and in particular one adapted to operate either under thrust or tension.

The invention will be well understood by reference to the following description of the illustrative embodiment thereof shown by way of example in the accompanying drawings, wherein:

Fig. 1 is a partial view of an automobile body showing a jack with suitable attachments supported therefrom by extensions, the assembly applied in a doorway as it might be used, for example, in straightening the windshield post;

Fig. 2 is an enlarged extension on the line 2—2 of Fig. 1;

Fig. 3 is a section on the line 3—3 of Fig. 2;

Fig. 4 is a view taken in a plane perpendicular to that of the section in Fig. 2, showing the parts separated, the male part at the left being shown in elevation and the female part at the right in section; and Figs. 5 and 6 are a plan and edge view respectively of a locking ring used in the construction.

Referring to Fig. 1 of the drawings, the assemblage of elements there shown in position for working on the automobile body comprises a hydraulic jack 10, consisting of a cylinder and a plunger or ram proper, which jack is operated from the remotely positioned hand pump 12. The jack illustrated is a double-acting jack as is indicated by the showing of two flexible conduits 14 leading from the pump to the jack cylinder. A coupling connects an extension tube 16 to the plunger and a suitable work-engaging head 18 is carried at the outer end of this extension. A similar but shorter extension 20 is supported from the base of the ram cylinder and carries a work-engaging head 22. Extensions of different lengths may be utilized and various types of work-engaging tools supported on such extensions or directly on elements of the jack. The assembly of the parts shown approximates in over-all length, when the ram is retracted, the diagonal of the door in which it is shown, and thus the powerful, but necessarily short, stroke of the jack is effective to exert stress on the windshield post. In the construction shown the parts exert thrust. With the double-acting jacks, such as illustrated, they may be used to apply tension and in certain hook-ups of parts with a single-acting jack it may be desirable to exert tension through some of the attached parts.

Hitherto these attachments and extensions have been joined by threads of the ordinary pipe thread types. This has certain disadvantages. The threads had to be cut on a lathe, since those formed by the usual pipe threading machines were not satisfactory for this use. The threaded joints required considerable time to assemble and disassemble and the latter job particularly might be difficult. The load was all on the threads. The threads, and in particular the male threads, were subject to accidental damage when the parts were not in use.

The present invention provides an improved connection of the plug and socket type with a cross pin which firmly secures the parts together, except when it is desired to separate them, the connection being effective under both tension and thrust, but easily and quickly separated.

Referring to Figs. 2 and 3 of the drawings, the connection comprises a male member 24 formed on or arranged for suitable connection to (as by means of such a coupling as is to be described) one of the parts, and a female member, herein merely the end portion of an extension tube such as 16 and marked with that numeral in these figures, the interior bore of which tube forms a socket receiving the cylindrical plug 26 of the male member, which member has a shoulder 28 at the base of the plug against which the end of the tube 16 rests. The plug is provided with a circumferential groove 30 which, when the parts are assembled, opposes a groove 32 in the interior surface of the female member 16. A split spring ring 34 is retained in the groove 32, its normal interior diameter being slightly less, and its normal exterior diameter somewhat more than the interior diameter of the tube 16. When the plug is advanced in the socket its cone end 36 expands the ring 34 and permits the plug to advance past the same until the groove 30 comes into the plane of the ring, when it will snap into a position wherein it lies partly in each of the grooves 30 and 32, and retains the two members together against casual separation. Since the right-hand side of the groove 30 is coned as seen in Fig. 4, and the ring 34 is round in cross section, the parts can be readily separated when it is desired to pull them apart. A connection such as has just been described is not novel in itself.

To make this connection one which will hold against considerable force, and in particular to permit it to transmit tension, a removable locking pin 38 passes through a hole 40 in the plug and holes 42 in the tube, which holes are aligned to receive the pin when the two elements are assembled. This pin will also prevent relative rotation of the coupled parts whether transmitting thrust or tension. The bores of these pin receiving holes peripherally intersect the grooves 30 and 32 respectively, as best seen in Fig. 4, so that the locking pin when inserted as shown in Fig. 2 will extend across the plane of the ring 34, presenting its side thereto. The pin has a coned end as shown which will displace the ring to permit the pin to be inserted. When the pin is in place the spring ring bears against its side to hold it. Preferably, as shown, the pin is provided with a groove 44 adjacent at least one end thereof, which will receive tthe ring 34 in the manner illustrated in Fig. 2, to retain the pin in position. The two ends of the pin are coned as shown, to permit its easy application from either side and with either end first. A pressure of the thumb on the pin will permit its withdrawal when it is desired to break the connection. The ring is an example of a single resilient catch which secures together socket and plug, socket and pin, and plug and pin.

The plug and socket and the members which carry them may be snapped together thrusting the former into the latter and will hold together at least under their own weight. One may then be rotated relative to the other to bring holes 40 and 42 into line, if necessary, and the pin snapped into position. Disassembly requires only pushing out the pin and pulling the members apart against the force of spring catch provided by the ring 34.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

I claim:

1. A coupling for use in connecting selectively assembled units to provide a linearly extended member through which thrust or tension is transmitted comprising a socket element and a cooperating male element fitting therein, the two having grooves on their interior and exterior surfaces respectively which oppose one another when the elements are assembled, one groove having a spring ring housed therein and adapted to engage the other to hold the elements against casual axial separation, said elements having transverse bores which are aligned to receive a locking pin when the elements are assembled, the bores peripherally intersecting the said grooves, and a locking pin having a groove into which said spring ring may enter to retain the pin when it is inserted in said bores.

2. A coupling for use in connecting selectively assembled units to provide a linearly extended member through which thrust or tension is transmitted comprising a socket element, a cooperating male element fitting therein, and a transverse locking pin passing through the same in their assembled position, the inner periphery of the socket element having a circular groove, a spring ring in the groove normally positioned in the path of the locking pin, the pin extending across the ring and having at least one groove into which a portion of the ring will project to retain the pin.

3. A coupling for use in connecting selectively assembled units to provide a linearly extended member through which thrust or tension is transmitted comprising a socket element, a cooperating male element fitting therein, and a transverse locking pin passing through the same in their assembled position, and a single resilient catch engaging the three parts at a point of common proximity and coupling the three against casual separation.

4. A coupling for use in connecting selectively assembled units to provide a linearly extended member through which thrust or tension is transmitted comprising a socket element and a cooperating male element fitting therein, the two having grooves on their interior and exterior surfaces respectively which oppose one another when the elements are assembled, one groove having a spring ring housed therein and adapted to engage the other to hold the elements against casual axial separation, said elements having transverse bores which are aligned to receive a locking pin when the elements are assembled, the bores peripherally intersecting the said grooves, and a locking pin for insertion through the bores having a tapered end to displace the spring axially of the assemblage as the pin is inserted, the spring, when the pin has been inserted, bearing on the side of the pin inwardly of said tapered end to retain the pin against casual withdrawal.

THOMAS M. PORTER.

REFERENCES CITED

The following references are of record in the file of this patent:

UNITED STATES PATENTS

| Number | Name | Date |
|--------|------|------|
| 998,210 | Slentz | July 18, 1911 |
| 2,080,844 | Wittig | May 18, 1937 |